United States Patent [19]

Sawano et al.

[11] Patent Number: 5,762,752
[45] Date of Patent: Jun. 9, 1998

[54] LAMINATOR CARRIER

[75] Inventors: Mitsuru Sawano; Hironobu Satou, both of Shizuoka-ken; Kiyoshi Iyama, Kanagawa, all of Japan

[73] Assignee: Fuji Photo Film Co., Ltd., Kanagawa, Japan

[21] Appl. No.: 710,722

[22] Filed: Sep. 20, 1996

[30] Foreign Application Priority Data

Sep. 26, 1995 [JP] Japan .................. 7-247671

[51] Int. Cl.$^6$ .................................. B32B 31/00
[52] U.S. Cl. ........................ 156/580; 156/583.1
[58] Field of Search ..................... 156/498, 538, 156/539, 580, 581, 583.1

[56] References Cited

U.S. PATENT DOCUMENTS

| 3,047,051 | 7/1962 | Matveeff | 156/539 |
|---|---|---|---|
| 3,598,684 | 8/1971 | Militana et al. | 156/583.5 X |
| 3,870,582 | 3/1975 | Brackett et al. | 156/581 X |
| 4,199,391 | 4/1980 | Andrews | 156/324.4 |
| 5,470,428 | 11/1995 | Sanko | 156/498 |
| 5,472,556 | 12/1995 | Sanko | 156/498 |

*Primary Examiner*—James Sells
*Attorney, Agent, or Firm*—Sughrue, Mion, Zinn, Macpeak & Seas, PLLC

[57] ABSTRACT

A laminator carrier, which holds superposed sheet members, is subjected to heat and pressure while being transported. The laminator carrier includes a carrier base on which the superposed sheet members are placed, a cover sheet which is disposed on the carrier base so as to cover the sheet members placed on the carrier base, a holding mechanism for holding the cover sheet such that the cover sheet is movable with respect to the carrier base in a transport direction of the laminator carrier. Accordingly, movement of the cover sheet during application of heat and pressure is absorbed by the holding member.

13 Claims, 14 Drawing Sheets

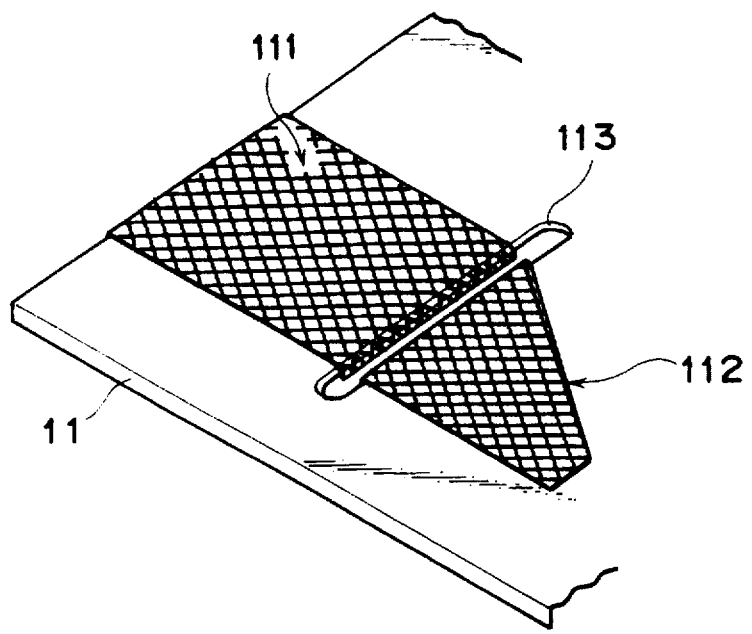
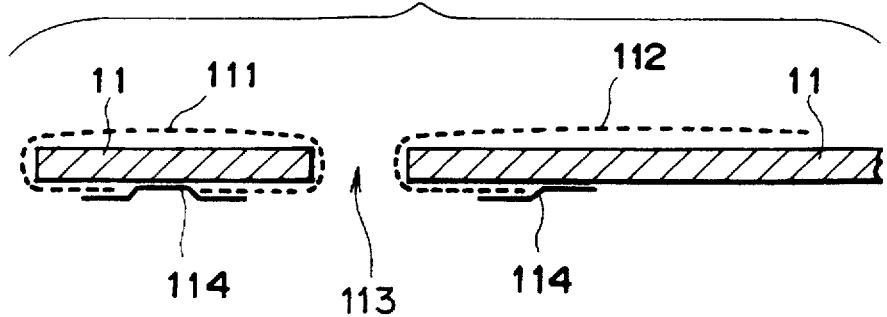

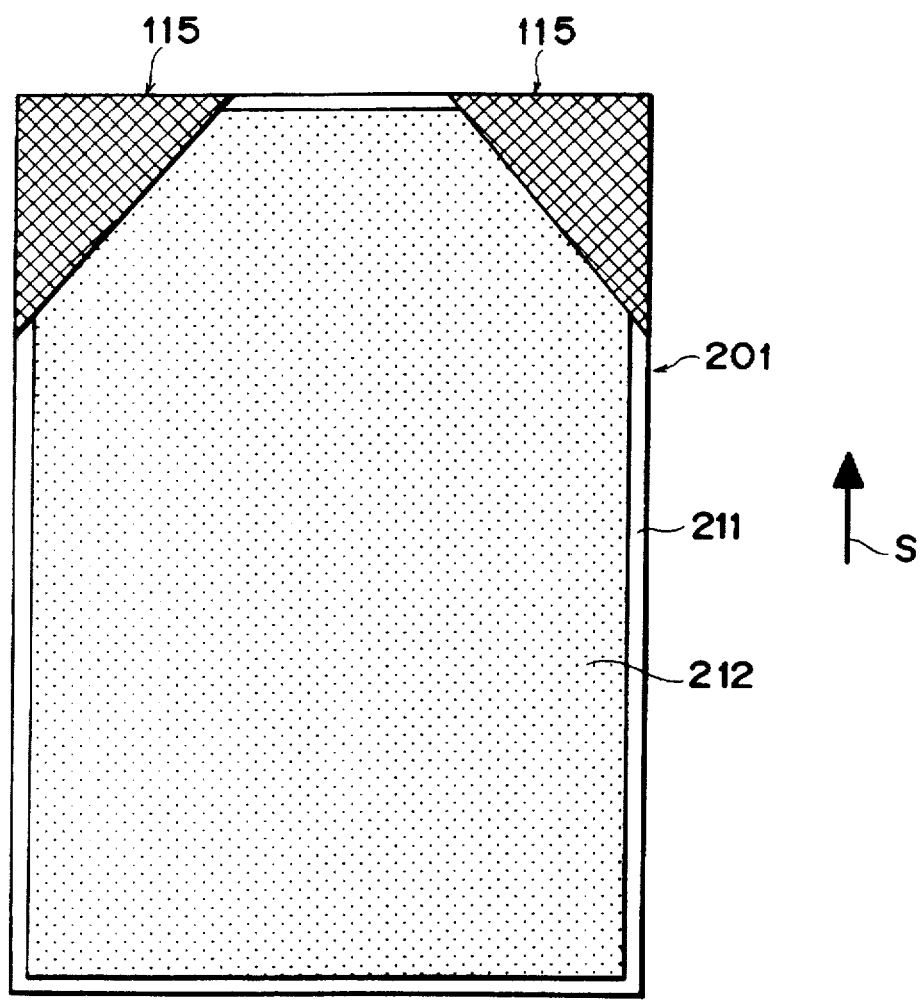

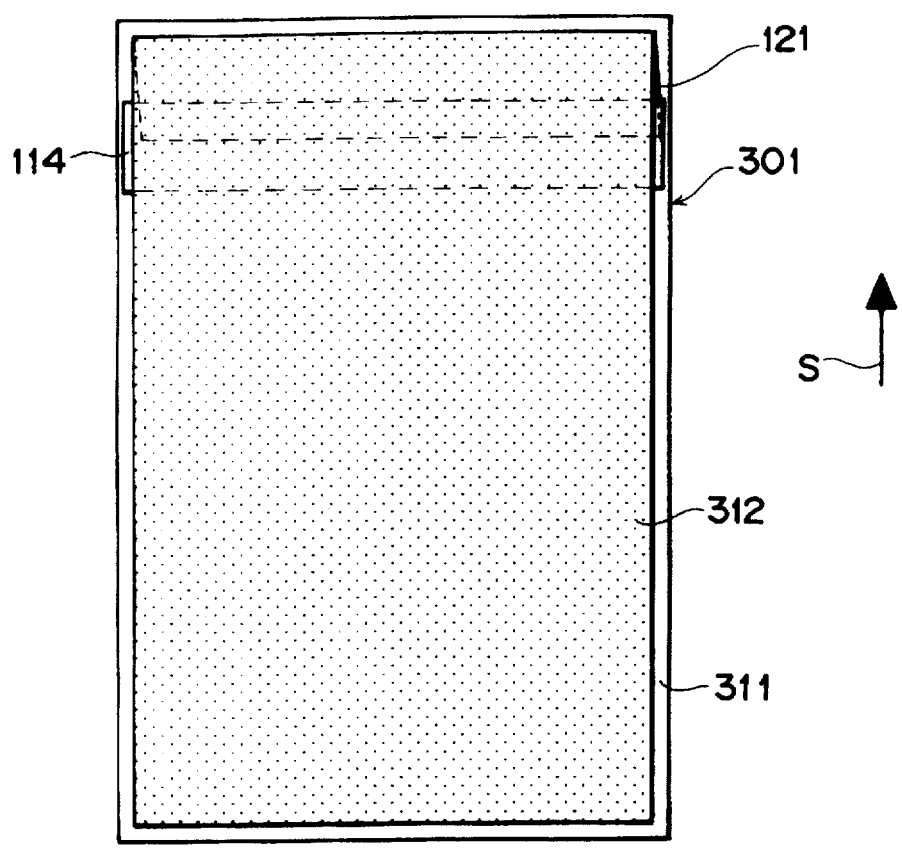

LAMINATOR CARRIER

BACKGROUND OF THE INVENTION

1. Field of the Invention

The present invention relates to a laminator carrier for use in threading superposed sheets into heat rollers.

2. Description of the Related Art

When an image-bearing sheet (hereinafter also referred to as a "transfer sheet") having thermal adhesiveness and being capable of heat transfer and a plain paper (hereinafter also referred to as a "receptor paper") are superposed on each other and passed through a laminator, only the image-bearing layer portion of the transfer sheet is transferred to the receptor paper.

However, if such superposed transfer sheet and receptor paper alone undergo threading (the term "threading" means superposed sheet and paper being held and conveyed by heat rollers under the application of heat and pressure), the transfer sheet will become curved due to differences in expansion and contraction, differences in thermal expansion coefficient, etc., which are caused by the difference in their materials. Consequently, concave- and convex-shaped wrinkles (hereinafter referred to as "warp") will be formed on the transfer sheet. Moreover, the threading in question has so far involved the problem that in the event the transfer sheet and the receptor paper are displaced from each other, the thermal adhesive material in the transfer sheet adheres to a heat roller whose surface temperature is as high as about 165° C. and causes staining of the heat roller. The threading of only the superposed transfer sheet and receptor paper h as so far involved a further problem that the front end thereof becomes entangled in the heat rollers or any other portion of the conveyance mechanism, so that jamming is apt to occur.

Heretofore, in order to solve the above-mentioned problems, there has been proposed such a laminator carrier 501 as shown in FIG. 13. FIG. 13 is a plan view illustrating the laminator carrier 501, in which a carrier base 511 and a cover sheet 512 are superposed on each other and subsequently their front ends in the threading direction (the direction in which the laminator carrier is conveyed while being held) are bonded together using a heat-resisting tape 513 or the like. FIG. 12 is an explanatory view showing a state in which threading is performed using the conventional laminator carrier 501. The laminator carrier 501 is used as follows: First, as shown in FIG. 12, the cover sheet 512 is opened, then superposed receptor paper 21 and transfer sheet 22 are inserted between the cover sheet 512 and the carrier base 511. The cover sheet 512 is then closed so as to return its original condition, and threading is performed while the transfer sheet and the receptor paper are held from both the surface side and the back side.

In a laminator, two heat rollers 3 are arranged one above the other such that one is located on the upper side and the other is located on the lower side so as to face each other. Each of the heat rollers 3 is made of, for example, an aluminum material, and the outer circumferential surface of each is covered with a covering layer 31 made of rubber or the like. At the center of each heat roller 3 is disposed a heater 32. One (for example, the lower) of the heat rollers 3 serves as a drive roller, while the other roller (upper roller) is free. The laminator carrier 501 is passed through between the upper and lower heat rollers 3 under application of heat and pressure, whereby images on the transfer sheet 22 are transferred to the receptor paper 21.

When the transfer sheet 22 and the receptor paper 21 are passed through the heat rollers 3 in the state of being held between the carrier base 511 and the cover sheet 512 of the laminator carrier 501, as described above, the transfer of images can be performed smoothly, while preventing occurrence of the above-described problems, i.e., adhesion of the thermal adhesive material to the heat rollers 3, and entanglement of the front end of the sheet.

In the conventional laminator carrier 501, the carrier base 511 and the cover sheet 512 are joined together at their front end portions, and the superposed receptor paper 21 and the transfer sheet 22 are held between the carrier base 511 and the cover sheet 512 at their rear portions so as to be passed through the heat rollers 3. In the laminator carrier 501, although it is possible to prevent the conventional problems, such as adhesion of the thermal adhesive material to the heat rollers 3 and entanglement of the front end of the sheet, the problem of warp sometimes occurs. That is, since the front end of the carrier base 511 and the front end of the cover sheet 512 are fixed together, the cover sheet 512 of the laminator carrier 501 moves rearward when the laminator carrier 501 is inserted between the heat rollers 3 from the front end thereof. The amount of rearward movement of the cover sheet 512 depends on differences in expansion and contraction, differences in thermal expansion coefficient, etc., which are caused by the difference in their materials. When the cover sheet 512 moves rearward, the transfer sheet 22 and the receptor paper 21 are displaced from each other accordingly, so that warp is produced.

The formation of such warp can be prevented by making the laminator carrier 501 using a pair of aluminum plates, or the like. In this case, since transmission of heat deteriorates, the speed of the threading must be decreased to about 1/10 of the conventional speed, and images cannot be transferred sufficiently even at such a low speed.

SUMMARY OF THE INVENTION

In view of the foregoing fact, it is an object of the present invention to provide a laminator carrier which prevents a transfer sheet and a receptor paper from warping, while maintaining a conventional threading speed and image transfer performance, thereby improving the quality of laminate.

A first aspect of the present invention, which achieves the above object, is a laminator carrier which holds superposed sheet members and which is subjected to heat and pressure while being transported. The laminator carrier comprises a carrier base on which the superposed sheet members are placed, a cover sheet which is disposed on the carrier base so as to cover the sheet members placed on the carrier base, and holding means for holding the cover sheet such that the cover sheet is movable with respect to the carrier base in a transport direction of the laminator carrier.

According to a second aspect of the present invention, in the laminator carrier according to the first aspect, the holding means comprises projections and holding portions. The projections are provided at the front end portion of the cover sheet in the transport direction of the laminator carrier such that each of the projections is situated at a corresponding end portion of the cover sheet in a direction substantially perpendicular to the transport direction of the laminator carrier. The holding portions are provided at the front end portion of the carrier base in the transport direction of the laminator carrier such that each of the holding portions is situated at a corresponding end portion of the carrier base in a direction substantially perpendicular to the transport direction of the laminator carrier. The holding portions correspond to the projections, and hold the projections while allowing the projections to move over a predetermined distance in the transport direction of the laminator carrier.

According to a third aspect of the present invention, in the laminator carrier according to the first aspect, the holding means comprises pocket portions each provided at a corresponding front end corner of the carrier base in the transport direction of the laminator carrier. Front end corners of the cover sheet in the transport direction of the laminator carrier are held between the pocket portions and the front end corners of the carrier base.

According to a fourth aspect of the present invention, in the laminator carrier according to the first aspect, the holding means comprises a flexible bent portion which is formed by bending the front end portion of the cover sheet in the transport direction of the laminator carrier in a direction opposite to the transport direction of the laminator carrier, and the front end portion of the bent portion is joined to the carrier base.

In the laminator carriers of the above-described types, the cover sheet is attached to the carrier base such that it is movable relative to the carrier base in the transport direction of the laminator carrier. Therefore, while the laminator carrier is threaded into the pair of heat rollers (i.e., while the laminator carrier, which holds superposed sheet members between its cover sheet and carrier base, is transported by the pair of heat rollers under application of heat and pressure), the expansion of the cover sheet due to heat occurs not only in the backward direction but also occurs in other directions. This expansion of the cover sheet is absorbed by movement of the cover sheet. The expansion of the cover sheet does not occur only in the backward direction. The expansion of the cover sheet is absorbed by movement of the cover sheet via the holding means, so that warp is eliminated.

A fifth aspect of the present invention is a laminator carrier which holds superposed sheet members and which is subjected to heat and pressure while being transported. The laminator carrier comprises a carrier base on which the superposed sheet members are placed, and a band-shaped cover sheet which is joined to the front end portion of the carrier base in the transport direction of the laminator carrier. The cover sheet extends in a direction perpendicular to the transport direction of the laminator carrier so as to cover at least front end portions of the superposed sheet members placed on the carrier base.

BRIEF DESCRIPTION OF THE DRAWINGS

FIG. 3 is an explanatory view showing the steps of attaching shift preventing guides and warp preventing guides to the carrier base;

FIG. 4 is a cross-sectional view showing an example of a manner of attachment of the shift preventing guides and warp preventing guides;

FIG. 7 is a plan view showing a second embodiment of the present invention;

FIG. 10A is a plan view showing a second example of a third embodiment of the present invention;

DETAILED DESCRIPTION OF THE PREFERRED EMBODIMENTS

Figure 12:
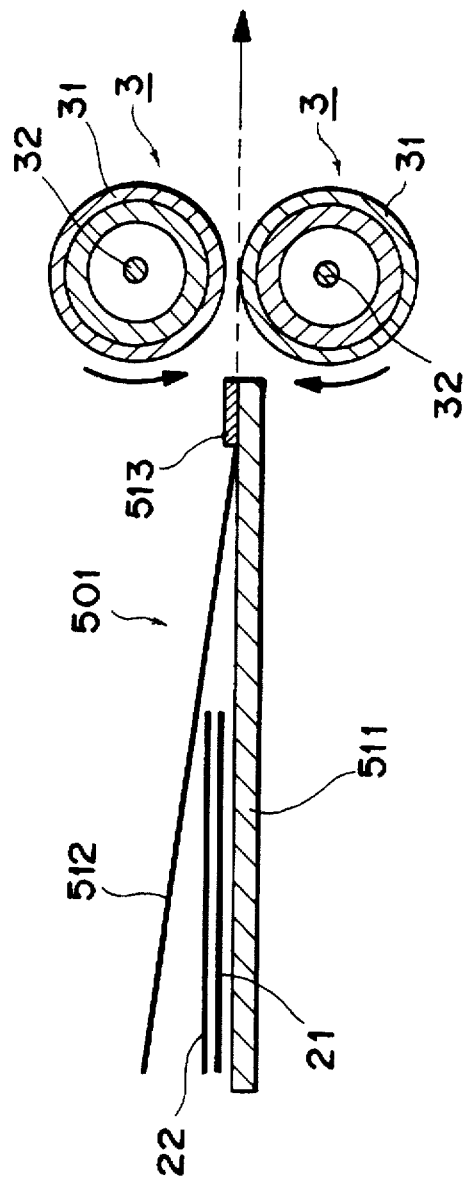
FIG. 12 is an explanatory view showing a state in which a conventional laminator carrier is passed through a laminator.
Figure 13:
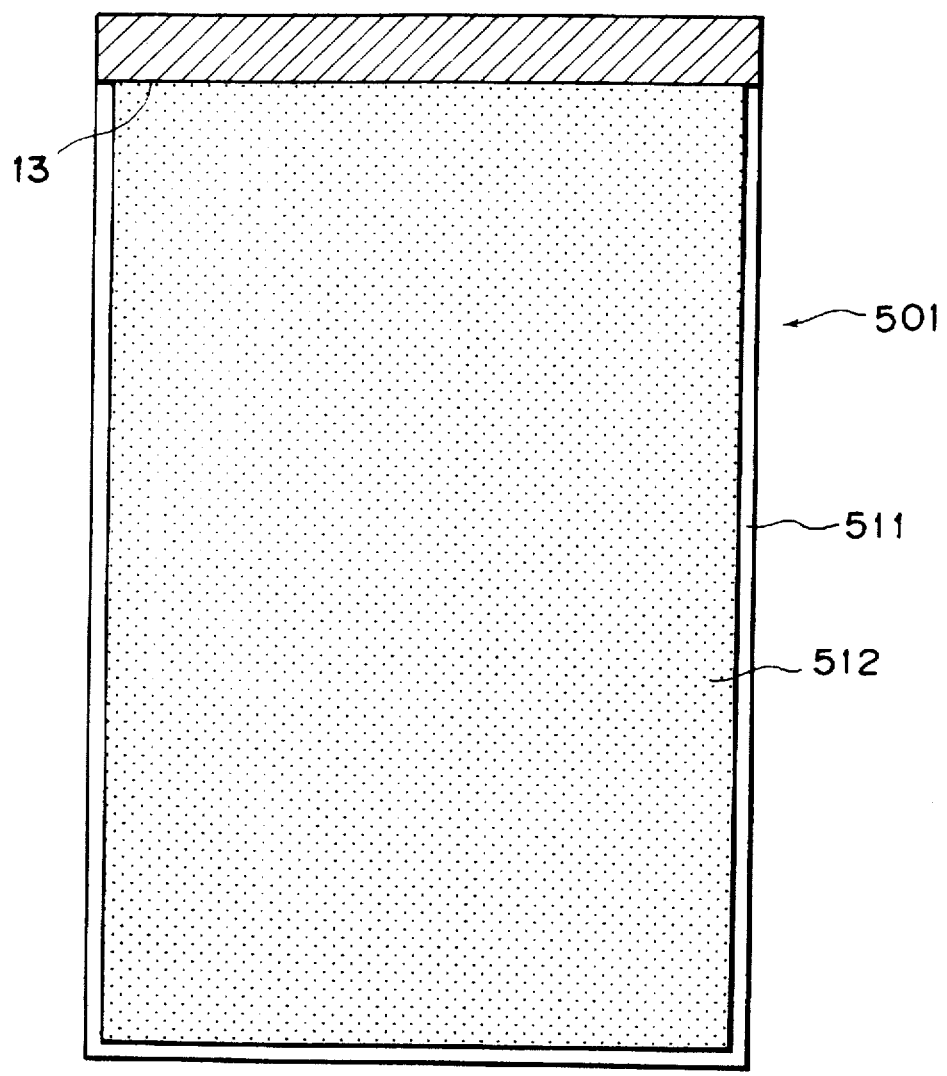
FIG. 13 is a plan view of the conventional laminator carrier.

First Embodiment:

The term "threading" used here means that a laminator carrier holding superposed sheet members or the superposed sheet members themselves are held and conveyed by heat rollers under the application of heat and pressure, as shown in FIG. 12.

Figure 2:
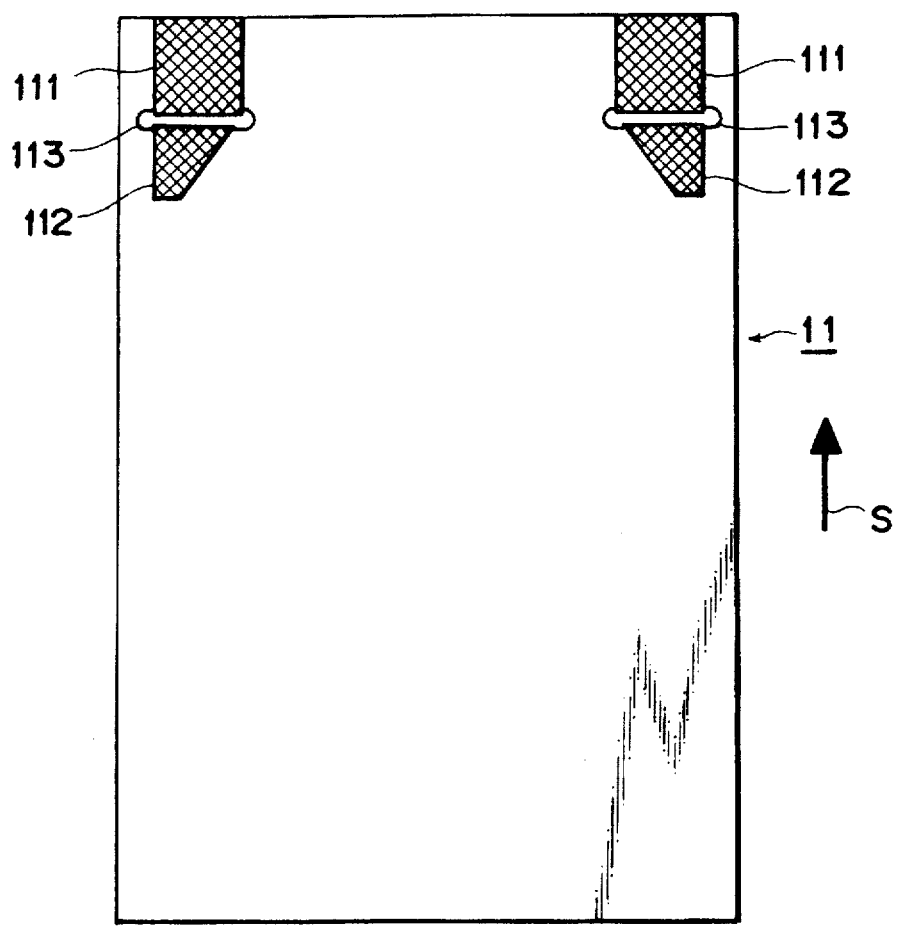
FIG. 2 is a plan view of the carrier base of the laminator carrier of FIG. 1.

As shown in FIG. 2, a rectangular carrier base 11 made of aluminum plate has elongated holes 113, which are formed at the front end portion of the carrier base 11 in a threading direction S such that the elongated holes 113 are situated in the vicinity of both side portions in the widthwise direction. Shift-preventing guides 111 and warp-preventing guides 112 are passed through and fixed to the elongated holes 113.

That is, as shown in FIGS. 3 and 4, the rectangular strip-like shift-preventing guides 111 are passed through the elongated holes 113 from the lower side of the carrier base 11; i.e., the side opposite the side where a receptor paper or sheet 21 and a transfer sheet 22 are placed on the carrier base 11. Portions of the shift-preventing guides 111 that project toward the upper side of the carrier base 11 (i.e., the side where the receptor paper 21 and the transfer sheet 22 are placed on the carrier base 11) are bent in the threading direction S, and then bent at the front edge of the carrier base 11 so as to return to the lower side of the carrier base 11. Subsequently, both ends of the rectangular strip-like shift-preventing guides 111 are fixed to the lower surface of the carrier base 11. The shift-preventing guides 111 are formed of, for example, 200 μm-thick polyimide film so as to have a sufficient strength. At least the portions of the shift-preventing guides 111 located on the upper side of the carrier base 11 are not bonded to the surface of the carrier base 11.

Similarly, the strip-like warp-preventing guides 112 each having a triangular tip end portion are passed through the elongated holes 113 from the lower side of the carrier base 11. Contrary to the shift-preventing guides 111, the tip end portions of the warp-preventing guides 112 which project toward the upper side of the carrier base 11 are bent in a direction opposite the threading direction S, so that the triangular tip end portions of the warp-preventing guides 112 are positioned on the upper surface of the carrier base 11. Like the shift-preventing guides 111, the warp-preventing guides 112 are made of, for example, 200 μm-thick polyimide film.

As shown in FIG. 4, the shift-preventing guides 111 inserted into the elongated holes 113 in the above-described manner are bent by an angle of 180° into a U-like shape. The front end portions of the shift-preventing guides 111 are wound around the front end portion of the carrier base 11 once, and, together with the rear end portions of the shift-preventing guides 11, are fixed to the lower surface of the carrier base 11 using a fixing member 114 such as adhesive tape.

The portions of the warp-preventing guides 112 located on the lower side of the carrier base 11 are fixed to the lower surface of the carrier base 11 using a fixing member 114 such as adhesive tape, as are the shift-preventing guides 111. The portions of the warp-preventing guides 112 located on the upper side of the carrier base 11 are bent in the direction opposite the threading direction and are separated from the upper surface of the carrier base 11.

Instead of adhesive tape, adhesive agent, both sides adhesive tape, and the like may be used as the fixing members 114 for the shift-preventing guides 111 and the warp-preventing guides 112.

Figure 1:
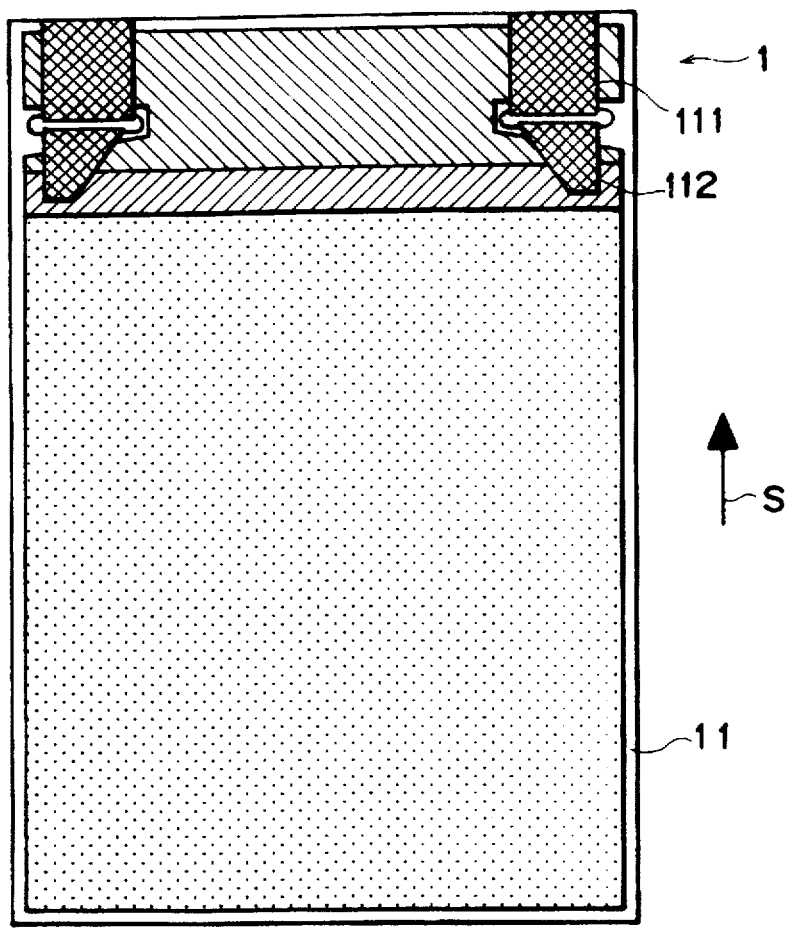
FIG. 1 is a plan view showing a laminator carrier according to the present invention.
Figure 5:
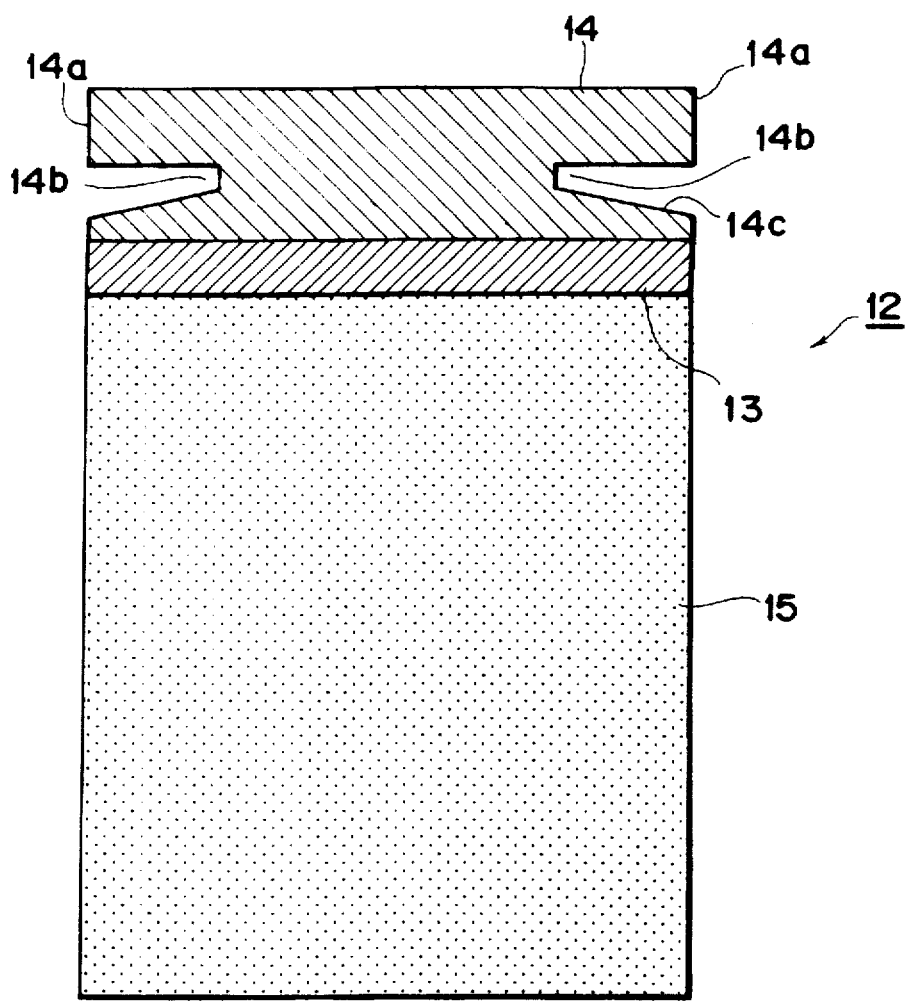
FIG. 5 is a plan view showing the cover sheet of the laminator carrier of FIG. 1.

As shown in FIG. 5, a cover sheet 12 consists of a cover film attachment guide 14 and a cover film 15 connected to the cover film attachment guide 14. The cover film attachment guide 14 preferably has a thickness of about 400 µm, because it is held and transferred by the pair of heat rollers 3 with a strong force. The cover film attachment guide 14 has a band-like shape which extends in the right and left (widthwise) direction of the carrier base 11. Concave portions 14b are formed in both side portions in the widthwise direction, whereby projections 14a projecting rightward and leftward (in widthwise direction) are formed at both side portions of the front end portion of the cover film attachment guide 14. These projections 14a are respectively inserted into narrow clearances between the carrier base 11 and the shift-preventing guides 111. FIG. 1 shows a state in which the projections 14a have been inserted between the carrier base 11 and the shift-preventing guides 111.

The cover film 15 is connected to the rear end of the cover film attachment guide 14 using a heat-resisting tape 13. The cover film 15 is formed of polyimide film having a thickness of 75 µm, as in the conventional laminator carrier. The cover film 15 is slightly smaller than the carrier base 11. Preferably, the cover film attachment guide 14 and the cover film 15 are connected with each other in the manner shown in FIG. 6A, because of the below described reason. That is, the heat-resisting tape 13 is applied in a state in which the cover film attachment guide 14 has been placed on the upper surface of the front end portion of the cover film 15.

The cover sheet 12, which has been formed by connecting the cover film attachment guide 14 and the cover film 15, is attached to the carrier base 11. As shown in FIG. 1, the projections 14a of the cover film attachment guides 14 are inserted between the shift-preventing guides 111 and the carrier base 11, and the front end portion of the cover film 15 is inserted between the warp-preventing guides 112 and the carrier base 11. Thus, the cover sheet 12 is attached to the carrier base 11.

In the laminator carrier 1 having the above-described structure, since the projections 14a of the cover film attachment guide 14 are inserted under the shift-preventing guides 111, the cover sheet 12 is held on the carrier base 11 such that it can move without slipping off. Moreover, in this state, the portions of the front end portion of the cover film 15 in the vicinity of both transverse ends are held between the carrier base 11 and the warp-preventing guide 112. Therefore, it becomes possible to prevent the occurrence of a U-shaped warp in which both transverse ends of the cover film 15 rise, which would otherwise occur during threading.

Moreover, an edge portion 14c of each of the concave portions 14b formed in the cover film attachment guide 14, located on the upstream side in the threading direction S, is inclined (tapered) such that the edge portions project slightly toward the transversely central portion of the cover film attachment guide 14. This prevents both widthwise direction ends of the cover film attachment guide 14 from lifting in a U-like shape.

Since the portions of the warp-preventing guides 112 located on the upper surface of the carrier base 11 each have a substantially triangular shape, the area for contact with the cover film 15 becomes small, so that the cover sheet 12 can be moved more easily than in the case where each of the portions located on the upper surface of the carrier base 11 has a rectangular shape.

In the laminator carrier 1, the cover sheet 12 is movably disposed on the carrier base 11. Therefore, when the cover sheet 12 and the carrier base 11, which hold the receptor paper 21 and a transfer sheet 22, are threaded through the heat rollers 3, the extension of the cover film 15 due to heat occur not only in the backward direction but also in other directions, and the extension is absorbed by movement of the cover sheet 12, so that the receptor paper 21 and the transfer sheet 22 do not displace with respect to each other, thereby preventing the occurrence of warp.

Figure 6A:
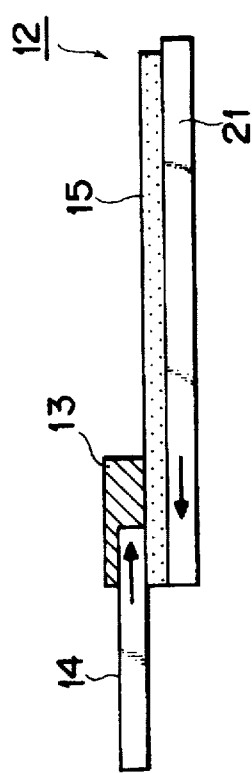
FIG. 6A is a view showing the structure of the connecting portion between a cover film attachment guide and a cover film, in which a heat-resisting tape is applied in a state in which the cover film attachment guide has been placed on the upper surface of the front end of the cover film.
Figure 6B:
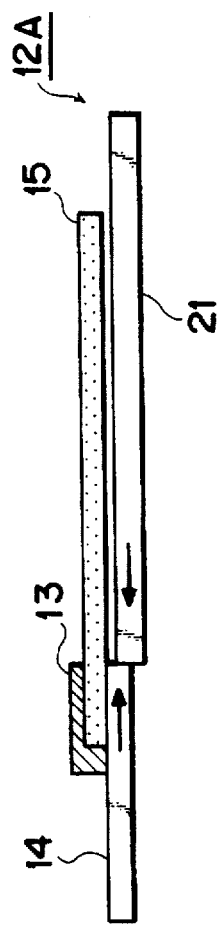
FIG. 6B is a view showing the structure of the connecting portion between the cover film attachment guide and the cover film, in which the cover film attachment guide is connected to the under surface of the cover film.

Different from the method of connecting the cover film attachment guide 14 and the cover film 15 shown in FIG. 6A, the cover film attachment guide 14 may be connected to the lower surface of the cover film 15, as shown in FIG. 6B. In this case, when the threading is performed (i.e., the laminator carrier is held and transported by the pair of the heat rollers), there exists possibility that the front edge of the receptor paper 21 hits the rear edge of the cover film attachment guide 14, thereby causing the central portion of the cover film attachment guide 14 to rise. Accordingly, it is preferred that the cover film attachment guide 14 be connected to the upper surface of the cover film 15.

Figure 8:
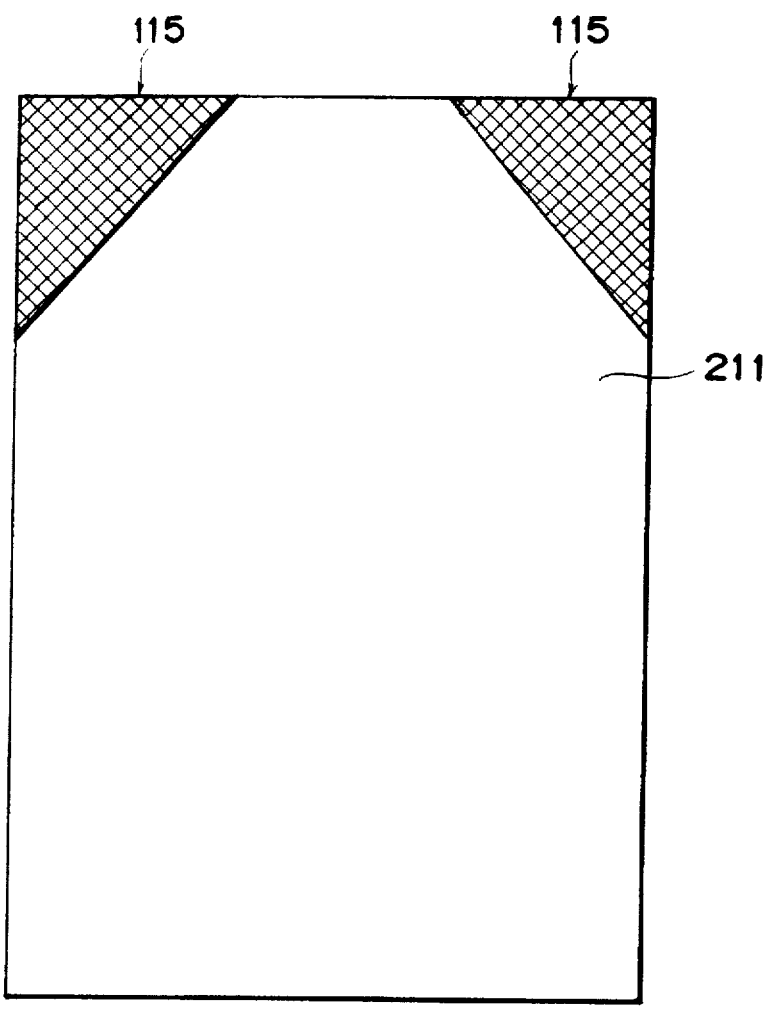
FIG. 8 is a plan view of the carrier base of the laminator carrier of FIG. 7.

Second Embodiment:

Next, a laminator carrier 201 according to a second embodiment of the present invention will be described with reference to FIGS. 7 and 8. FIG. 7 is a plan view showing the second embodiment of the present invention, and FIG. 8 is a plan view of the carrier base 211 of the laminator carrier shown in FIG. 7.

In this embodiment, triangular pocket portions 115 are formed at both corner portions (right and left corners in FIG. 7) of the front end portion of the carrier base 211 in the threading direction S. As shown in FIG. 7, right-angled triangular films are disposed on the carrier base 211 such that the right-angle corners of the films correspond to the corner portions of the carrier base 211, and two sides located on both sides of the right-angle corner of each film are fixed to the carrier base 211. Thus, the pocket portions 115 are formed. Accordingly, at the oblique sides of the films, there are formed opening portions of clearances between the pocket portions 115 and the carrier base 211. Both end corners of the front end portion of the cover sheet 212 in the threading direction S are inserted into the pocket portions 115.

In the laminator carrier 201 having the above-described structure, the cover sheet 212 is held by inserting both end corners of the front end portion of the cover sheet 212 in the threading direction S into the pocket portions 115. Therefore, as in the laminator carrier 1 of the first embodiment, the cover sheet 212 can be moved relative to the carrier base 211.

Since the laminator carrier 201 allows the cover sheet 12 to be movably held on the carrier base 211, the laminator carrier 201 provides effects similar to those provided by the laminator carrier 1 of the first embodiment, and can be formed in a simple structure so as to reduce the production cost.

Third Embodiment:

Next, the laminator carrier 301 according to a third embodiment of the present invention will be described with reference to FIGS. 9A, 9B, 10A and 10B.

Figure 9A:
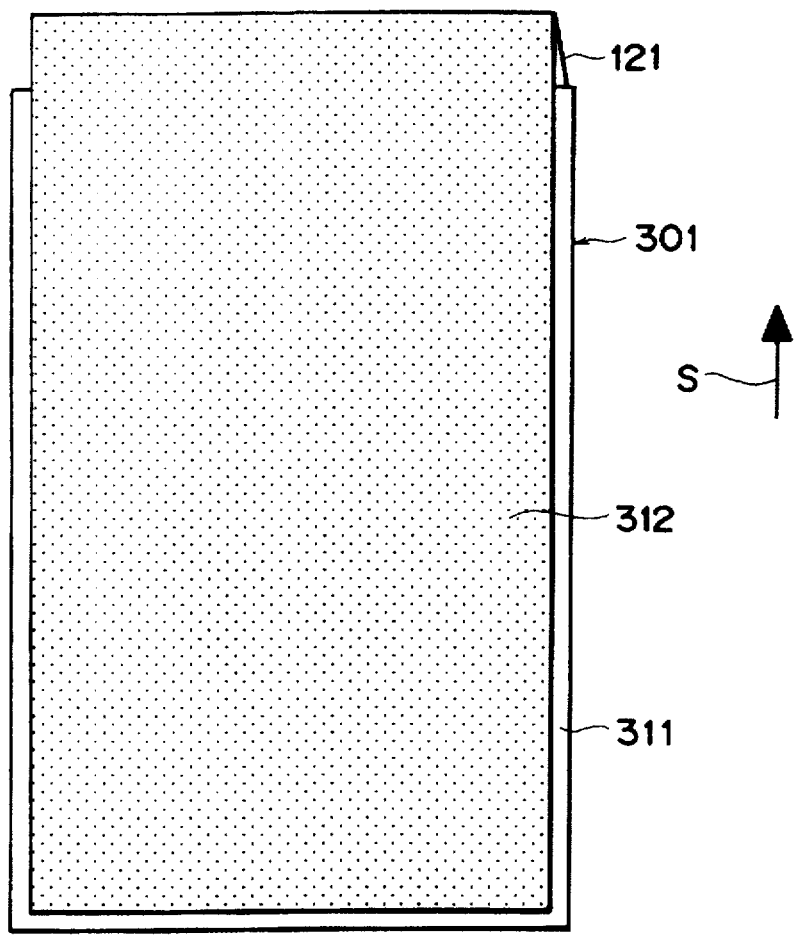
FIG. 9A is a plan view showing a first example of a third embodiment of the present invention.
Figure 9B:
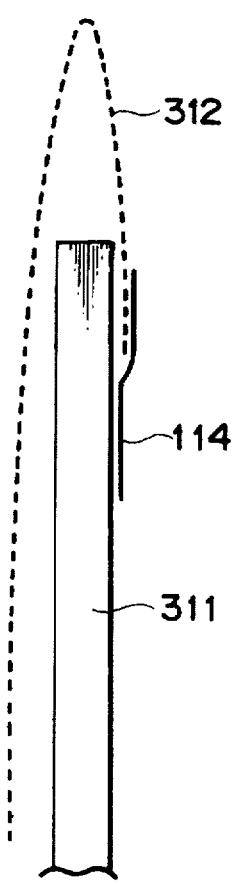
FIG. 9B is a side view showing the first example of the third embodiment of the present invention.
Figure 10B:
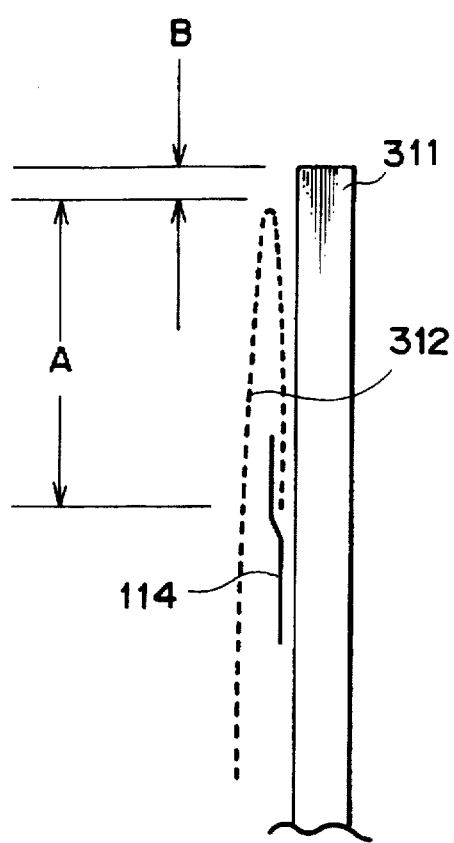
FIG. 10B is a side view showing the second example of the third embodiment of the present invention.

In the laminator carrier 301 according to the present embodiment, a cover sheet bent portion 121 is formed by bending a cover sheet 312 at a position in the vicinity of the front end portion thereof in the transport direction S, and the front end portion of the cover sheet bent portion 121 is joined to the lower surface of a carrier base 311 having a rectangular plate-like shape, or to the upper surface of the carrier base 311 in the vicinity of the front end thereof. FIGS. 9A and 9B show an example in which the cover sheet bent portion 121 is connected to the lower surface of the carrier base 311, while FIGS. 10A and 10B show an example in which the cover sheet bent portion 121 is connected to the upper surface of the carrier base 311 in the vicinity of the front end thereof.

As shown in FIG. 9A, the cover sheet 312 is bent at a position in the vicinity of the front end portion thereof in the transport direction S such that the thus-bent front end portion is located on the lower side of the carrier base 311. As shown in FIG. 9B, the bent front end portion is fixed to the lower surface by using fixing members 114 such as adhesive tape. Accordingly, the cover sheet 312 is disposed on the carrier base 311 such that the cover sheet bent portion 121 projects from the front end of the carrier base 311 in the threading direction.

In the laminator carrier 301 having the above-described structure, since the cover sheet 312 extends via the cover sheet bent portion 121 located at the front end of the carrier base 311, the elasticity of the bent portion makes it possible to attach the cover sheet 312 to the carrier base 311 while allowing movement of the cover sheet 312 relative to the carrier base 311. In this laminator carrier 301, although the amount of movement of the cover sheet 312 is relatively small, the laminator carrier 301 can provide effects similar to those provided by the laminator carriers 1 and 201 of the first and second embodiments. In addition, the laminator carrier 301 has a simple structure, and therefore can be manufactured easily. In the present embodiment, the cover sheet bent portion 121 is formed as a part of the cover sheet 312. However, when the cover sheet bent portion 121 is made of a material different from that of the cover sheet 312 so as to have a larger elasticity, further improved performance can be obtained.

In the laminator carrier 301, the cover sheet 312 is bent at a position in the vicinity of the front end thereof in the threading direction S, and the front end portion thus bent is connected to the upper surface of the carrier base 311 in the vicinity of the front end of the carrier base 311. That is, the bent front end portion is fixed to the upper surface of the carrier base 311 in the vicinity of the front end thereof by using a fixing member 114 such as adhesive tape, as shown in FIG. 10B. Accordingly, the cover sheet 312 is disposed on the carrier base 311 such that the cover sheet bent portion 121 faces in the threading direction S. The elasticity of the bent portion makes it possible to attach the cover sheet 312 to the carrier base 311 while allowing movement of the cover sheet 312 relative to the carrier base 311. This effect was obtained when the length A of the bent portion was in the range of 3–50 mm, and the most preferable range was 5–15 mm. Also, a good result was obtained when the front end portion of the bent portion was located inside away from the front edge of the carrier base 311 slightly (indicated by B in FIG. 10B) The preferable range of the length B was 0.1–20 mm.

Figure 11:
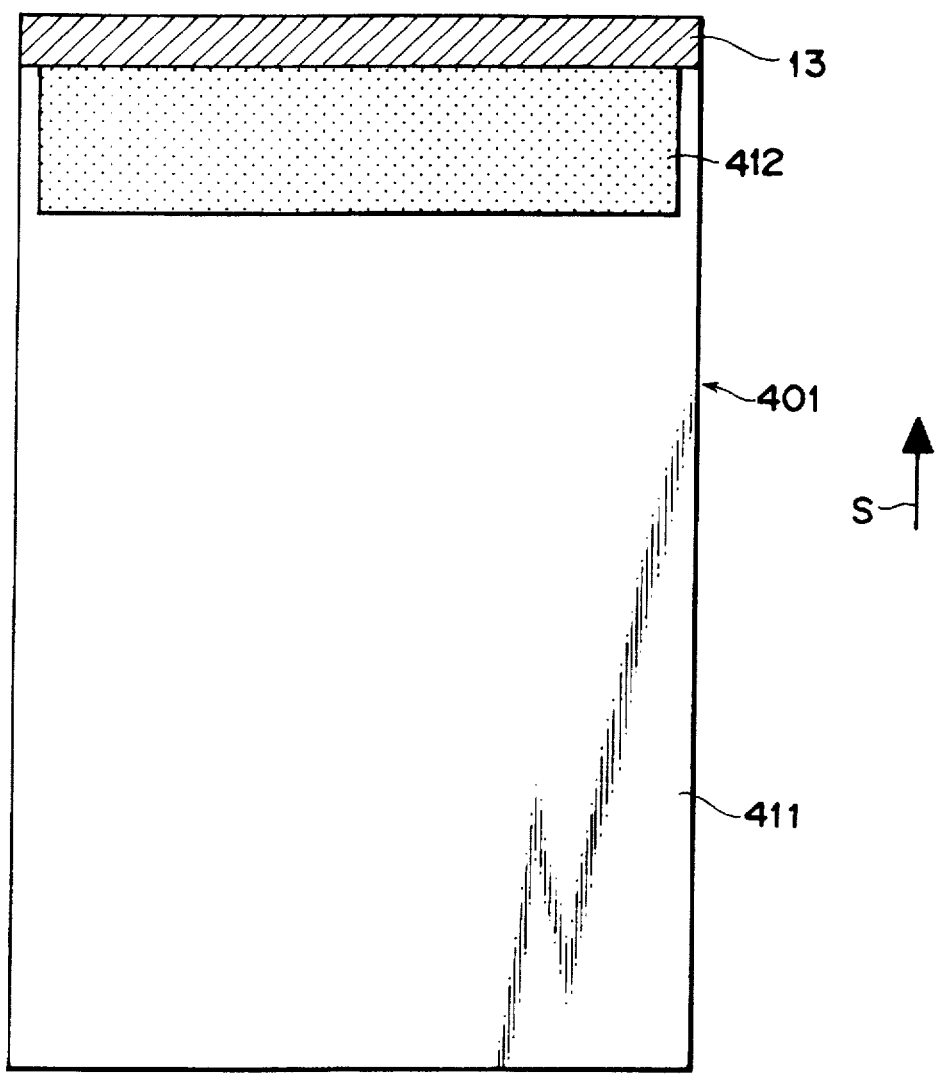
FIG. 11 is a plan view showing a fourth embodiment of the present invention.

Fourth Embodiment:

Next, a laminator carrier 401 according to a fourth embodiment of the present invention will be described with reference to FIG. 11. FIG. 11 shows a plan view for explaining the fourth embodiment of the present invention.

In the laminator carrier 401 of the present embodiment, a band-shaped cover sheet 412, which extends in the right and left (widthwise) direction of a carrier base 411 having a rectangular planar shape, is disposed on the front end portion of the carrier base 411 in the threading direction S. The front end portion of the cover sheet 412 in the threading direction S is connected to the carrier base 411 by using a heat-resisting tape 13, whereby the cover sheet 412 is connected to the carrier base 411. Accordingly, the cover sheet 412 is provided to cover only the front end portion of the carrier base 411 in the threading direction S and portions in the vicinity thereof. Accordingly, even in the state in which the cover sheet 412 has been attached to the carrier base 411, most part of the upper surface of the carrier base 411 is exposed.

In the laminator carrier 401 having the above-described structure, only the front end portions and their neighboring portions of the receptor paper 21 and the transfer sheet 22 are held between the carrier base 411 and the cover sheet 412, so that the remaining portion of the transfer sheet 22 is exposed on the carrier base 411.

In the area where the transfer sheet is exposed, it is impossible to prevent dirt from adhering to the heat roller 3. However, since the front end portion of the transfer sheet is held, the transfer sheet is prevented from becoming entangled. Moreover, since most of the transfer sheet is not covered by the cover sheet 412 and is exposed, a shift therebetween due to wrinkles of the cover sheet 412 does not occur, so that the generation of warp is prevented.

In the laminator carrier 401 of the present embodiment, the generation of a warp can be prevented. In addition, since the laminator carrier 401 can be made by cutting the cover film of a conventional laminator carrier, the laminator carrier 401 can be manufactured by adapting a conventional laminator carrier.

The laminator Carriers of the above-described embodiments can be used not only for the receptor paper 21 and the transfer sheet 22 described in the above embodiments, but also for the case where film is accurately laminated on the surface of paper; for the case where a film, plate or paper, which is hardly softened by heat, is superposed on paper so as to transfer the unevenness or smoothness of the film, plate or paper to the paper; and for other similar cases.

As described above, in the laminator carriers according to the present invention, the cover sheet is held on the carrier base such that the cover sheet is movable in the threading direction of the laminator carrier. Accordingly, when the laminator carrier, which holds sheets, is subjected to threading, shifts of the cover sheet due to variations in the load are absorbed by movement of the cover sheet. In addition, since it is possible to prevent disposed sheets from shifting from each other, generation of warp is prevented, so that lamination quality is improved.

What is claimed is:

1. A laminator carrier which holds superposed sheet members and which is subjected to heat and pressure while being transported, said laminator carrier comprising:

a carrier base on which said superposed sheet members are placed;

a cover sheet which is disposed on said carrier base so as to cover the sheet members placed on said carrier base; and holding means for holding said cover sheet such that when said cover sheet is disposed on said carrier base, said cover sheet is movable with respect to said carrier base in a transport direction of said laminator carrier.

2. A laminator carrier according to claim 1, wherein said holding means comprises:

projections provided at a front end portion of said cover sheet in the transport direction of said laminator carrier such that each of said projections is situated at a corresponding end portion of said cover sheet in a direction substantially perpendicular to the transport direction of said laminator carrier; and holding portions provided at the front end portion of said carrier base in the transport direction of said laminator carrier such that each of said holding portions is situated at a corresponding end portion of said carrier base in a direction substantially perpendicular to the transport direction of said laminator carrier, said holding portions corresponding to said projections, and said holding portions being adapted to hold said projections while allowing said projections to move over a predetermined distance in the transport direction of said laminator carrier.

3. A laminator carrier according to claim 2, wherein said cover sheet comprises:

a cover sheet attaching member which is supported by the front end portion of said carrier base in the transport direction of said laminator carrier and which has a band-like shape extending in a direction perpendicular to the transport direction of said laminator carrier; and a cover film member connected to the rear end portion of said cover sheet attaching member in the transport direction of said laminator carrier and adapted to cover the sheet members placed on said carrier base.

4. A laminator carrier according to claim 3, wherein said cover sheet attaching member has said projections.

5. A laminator carrier according to claim 4, wherein a concave portion is formed in each of end portions of said cover sheet attaching member in a direction substantially perpendicular to the transport direction of said laminator carrier, whereby said projections are formed between the front edge of said cover sheet attaching member in the transport direction of said laminator carrier and said concave portions.

6. A laminator carrier according to claim 3, wherein a part of said cover sheet attaching member and a part of said cover film member are superposed and connected together such that the part of said cover sheet attaching member is located above the part of said cover film member when said cover sheet is placed on said carrier base.

7. A laminator carrier according to claim 6, wherein a pair of warp-preventing guides are provided, said warp-preventing guides being supported by said carrier base at the front end portion thereof in the transport direction of said laminator carrier such that said warp-preventing guides are located on portions in the vicinity of both end portions in a direction substantially perpendicular to the transfer direction of said laminator carrier, whereby said cover film member is prevented from warping in a generally U-like shape.

8. A laminator carrier according to claim 1, wherein said holding means comprises pocket portions each provided at a corresponding front end corner of said carrier base in the transport direction of said laminator carrier, and front end corners of said cover sheet in the transport direction of said laminator carrier being held between said pocket portions and the front end corners of said carrier base.

9. A laminator carrier according to claim 8, wherein each of said pocket portions is a right-angled triangular member, two sides of said right-angled triangular member on both sides the right-angle corner thereof being fixed to the corresponding corner of said carrier base, and the corner portion of said cover sheet is inserted into said pocket portion passing under the oblique side of the said right-angled triangular member.

10. A laminator carrier according to claim 1, wherein said holding means comprises a flexible bent portion which is formed by bending the front end portion of said cover sheet in the transport direction of said laminator carrier in a direction opposite the transport direction of said laminator carrier, and the front end portion of said bent portion is joined to said carrier base.

11. A laminator carrier according to claim 10, wherein the front end portion of said bent portion is joined to a surface of said carrier base, on which surface said superposed sheet members are placed.

12. A laminator carrier according to claim 10, wherein the front end portion of said bent portion is joined to a surface of said carrier base opposite the surface on which said superposed sheet members are placed.

13. A laminator carrier which holds superposed sheet members and which is subjected to heat and pressure while being transported, said laminator carrier comprising:

a carrier base on which said superposed sheer members are placed; and a band-shaped cover sheet which is joined to the front end portion of said carrier base in the transport direction of said laminator carrier and which extends in a direction perpendicular to the transport direction of said laminator carrier so as to partially cover said superposed sheet members placed on said carrier base, said superposed sheet members being movable with respect to the carrier base.

\* \* \* \* \*